US012499498B2

(12) United States Patent
Covell et al.

(10) Patent No.: US 12,499,498 B2
(45) Date of Patent: Dec. 16, 2025

(54) USING A MACHINE LEARNING MODEL TO OPTIMIZE GROUPINGS IN A BREAKOUT SESSION IN A VIRTUAL CLASSROOM

(71) Applicant: International Business Machines Corporation, Armonk, NY (US)

(72) Inventors: Jacob Thomas Covell, New York, NY (US); Pranav Chunduri, Cary, NC (US); Clarissa Ho, New York, NY (US); Clement Decrop, Arlington, VA (US)

(73) Assignee: International Business Machines Corporation, Armonk, NY (US)

( * ) Notice: Subject to any disclaimer, the term of this patent is extended or adjusted under 35 U.S.C. 154(b) by 1001 days.

(21) Appl. No.: 17/208,574

(22) Filed: Mar. 22, 2021

(65) Prior Publication Data

US 2022/0301087 A1  Sep. 22, 2022

(51) Int. Cl.
*G06Q 50/20* (2012.01)
*G06N 20/00* (2019.01)
*G09B 5/12* (2006.01)

(52) U.S. Cl.
CPC .............. *G06Q 50/20* (2013.01); *G06N 20/00* (2019.01); *G09B 5/125* (2013.01)

(58) Field of Classification Search
CPC .......... G06Q 50/20; G06N 20/00; G09B 5/12; G09B 5/125
See application file for complete search history.

(56) References Cited

U.S. PATENT DOCUMENTS 9,626,875 B2  4/2017 Gal
11,119,630 B1 * 9/2021 Marchetti .......... G06Q 10/0635
(Continued)

FOREIGN PATENT DOCUMENTS

CN  111539859 A  8/2020

OTHER PUBLICATIONS

"Build Apps with Natural Language Processing (NLP)", IBM Watson, last printed Mar. 16, 2021, 7 pages, <https://www.ibm.com/watson/natural-language-processing>.
(Continued)

*Primary Examiner* — Timothy A Musselman
(74) *Attorney, Agent, or Firm* — Edward Wixted; Andrew D. Wright; Calderon Safran & Wright P.C.

(57) ABSTRACT

A computer-implemented method and a computer program product for optimizing groupings in a breakout session in a virtual classroom. A computer retrieves profiles of students in the virtual classroom, where the profiles of the students include data of academic performances of the students. The computer retrieves a known correspondents archive which includes historic data of productivities correlated to interactions among the students. In response to initialization of the breakout session in the virtual classroom, the computer determines optimal groups that yield most productive results, based on the profiles of the students, the known correspondents archive, and requirements of group settings given by an instructor, using a machine learning model. The computer provides the instructor with the optimal groups. In another embodiment, the computer analyzes context of customized assignments for the breakout session and determines the optimal groups further based on the context to the customized assignments.

20 Claims, 5 Drawing Sheets

(56) References Cited

U.S. PATENT DOCUMENTS

| | | | | |
|---|---|---|---|---|
| 2014/0315178 | A1* | 10/2014 | Ngiam | G09B 7/073 |
| | | | | 434/350 |
| 2018/0165779 | A1 | 6/2018 | Martin | |
| 2018/0247549 | A1* | 8/2018 | Martin | G09B 19/00 |
| 2020/0098354 | A1* | 3/2020 | Lin | G10L 15/22 |
| 2020/0311347 | A1* | 10/2020 | Theobald | G06F 40/35 |
| 2021/0241650 | A1* | 8/2021 | Schlesinger | G09B 19/00 |

OTHER PUBLICATIONS

"Leveraging education technology helps drive better learning outcomes and operations", IBM, last printed Mar. 16, 2021, 6 pages, <https://www.ibm.com/industries/education>.

"P-TECH: when skills meet opportunity, success happens", IBM, last printed Mar. 16, 2021, 4 pages, <https://www.ibm.com/thought-leadership/ptech/index.html>.

"Watson Natural Language Understanding", IBM, last printed Mar. 16, 2021, 7 pages, <https://www.ibm.com/cloud/watson-natural-language-understanding>.

Holmberg, Kaj, "Formation of student groups with the help of optimisation", Journal of the Operational Research Society, 2019, vol. 70, No. 9, pp. 1538-1553, <https://www.tandfonline.com/doi/epub/10.1080/01605682.2018.1500429?needAccess=true>.

Johnson, Ben, "Student Learning Groups: Homogeneous or Heterogeneous?", Edutopia, Updated Jan. 2, 2014, 4 pages, <https://www.edutopia.org/blog/student-grouping-homogeneous-heterogeneous-ben-johnson>.

Krauss, et al., "Optimizing the Assignment of Students to Classes in an Elementary School", Informs Transactions on Education, 14(1), © 2013 Informs, pp. 39-44, <https://pubsonline.informs.org/doi/pdf/10.1287/ited.2013.0111>.

Mell, et al., "The NIST Definition of Cloud Computing", National Institute of Standards and Technology, Special Publication 800-145, Sep. 2011, 7 pages.

* cited by examiner

USING A MACHINE LEARNING MODEL TO OPTIMIZE GROUPINGS IN A BREAKOUT SESSION IN A VIRTUAL CLASSROOM

BACKGROUND

The present invention relates generally to a machine learning model for a virtual classroom, and more particularly to using a machine learning model to optimize groupings in a breakout session in a virtual classroom.

With increased use of online resources, optimizing these online resources becomes more and more important. Breakout rooms have proven extremely useful as they allow students to break into smaller groups, while allowing the teacher to manage all of the students. However, breaking students up into the breakout rooms can be time consuming and non-trivial.

Regarding breaking students up into groups, some educators firmly believe that a teacher must mix groups so that students of all levels are represented in each group, while others believe that a teacher must organize students by ability levels. Some research believe that the both methods have advantages.

SUMMARY

In one aspect, a computer-implemented method for optimizing groupings in a breakout session in a virtual classroom is provided. The computer-implemented method includes retrieving profiles of students in the virtual classroom, where the profiles of the students include data of academic performances of the students. The computer-implemented method further includes retrieving a known correspondents archive which includes historic data of productivities correlated to interactions among the students. In response to initialization of the breakout session in the virtual classroom, the computer-implemented method further includes determining optimal groups that yield most productive results, based on the profiles of the students, the known correspondents archive, and requirements of group settings given by an instructor, using a machine learning model. The computer-implemented method further includes providing the instructor with the optimal groups.

In another aspect, a computer program product for optimizing groupings in a breakout session in a virtual classroom is provided. The computer program product comprises a computer readable storage medium having program instructions embodied therewith, and the program instructions are executable by one or more processors. The program instructions are executable to: retrieve profiles of students in the virtual classroom, where the profiles of the students include data of academic performances of the students; retrieve a known correspondents archive which includes historic data of productivities correlated to interactions among the students; in response to initialization of the breakout session in the virtual classroom, determine optimal groups that yield most productive results, based on the profiles of the students, the known correspondents archive, and requirements of group settings given by an instructor, using a machine learning model; and provide the instructor with the optimal groups.

In yet another aspect, a computer-implemented method for optimizing groupings in a breakout session in a virtual classroom is provided. The computer-implemented method includes retrieving profiles of students in the virtual classroom, where the profiles of the students include data of academic performances of the students. The computer-implemented method further includes retrieving a known correspondents archive which includes historic data of productivities correlated to interactions among the students. The computer-implemented method further includes receiving, from an instructor, predefined group settings, wherein one of the predefined group settings requires that each group includes students with a similar academic level. The computer-implemented method further includes analyzing context of customized assignments for the breakout session, where the customized assignments have different levels of academic challenges for different groups. The computer-implemented method further includes determining optimal groups that yield most productive results, based on academic levels included in the profiles of the students, the known correspondents archive, the context of the customized assignments, and the predefined group settings, using a machine learning model. The computer-implemented method further includes providing the instructor with the optimal groups. The computer-implemented method further includes assigning the customized assignments to respective ones of the optimal groups.

DETAILED DESCRIPTION

Embodiments of the present invention disclose an approach of using a machine learning model to optimize groupings in a breakout session in a virtual classroom. Embodiments of the present invention are now described in detail with reference to the accompanying figures.

Figure 1:
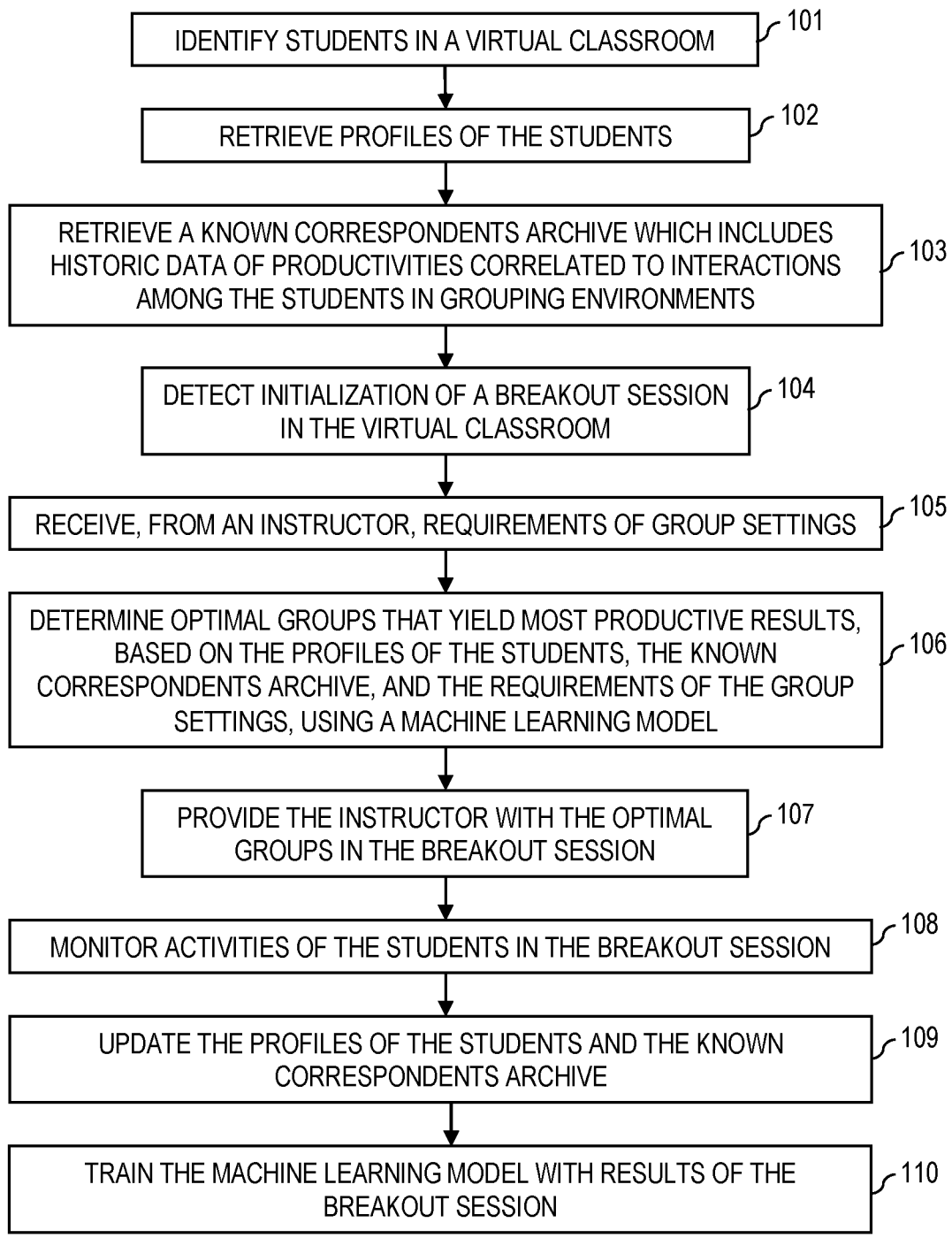
FIG. 1 presents a flowchart showing operational steps of optimizing groupings in a breakout session in a virtual classroom, in accordance with one embodiment of the present invention.

FIG. 1 presents a flowchart showing operational steps of optimizing groupings in a breakout session in a virtual classroom, in accordance with one embodiment of the present invention. The operational steps shown in FIG. 1 are implemented by a computing device or a server. A computing device or server is described in more detail in later paragraphs with reference to FIG. 3. In some embodiments, the operational steps may be implemented in a cloud computing environment. The cloud computing environment is described in later paragraphs with reference to FIG. 4 and FIG. 5. A system of optimizing groupings in a breakout session in a virtual classroom is installed as an extension to an existing conferencing platforms if an instructor and students of a virtual classroom opt in using the system for optimizing groupings. Consents of the students and the instructor are required in using the system for optimizing groupings. In acquiring, processing, storing, transferring, and using the data by the system, laws are observed and privacy of the students and the instructor is protected.

At step 101, the computing device or server identifies students in a virtual classroom. For example, the computing device or server may use at least one of the following techniques for identifying students: user login credentials, facial recognition through front-facing cameras of computing devices of the students, audio voice recognition from microphones of computing devices of the students, and single sign-on.

At step 102, the computing device or server retrieves profiles of the students. The profiles of the students may include, for example, data of academic performances of the students. The profiles of the students may be established by the input of an instructor of the virtual classroom. The profiles of the students may also be established by automate feed from a grading system and/or other systems related to educational programs. The computing device or server may collect, analyze, and aggregate data to create the holistic profiles of the students.

At step 103, the computing device or server retrieves a known correspondents archive which includes historic data of productivities correlated to interactions among the students in grouping environments (or in previous breakout sessions of virtual classrooms). The known correspondents archive is established by tracking interactions among the students and correspondences with each other and by analyzing group dynamics within the virtual classroom. For example, the known correspondents archive may include but not limited to the following information: how recently and/or frequently a student interacts with specific correspondents, and whether working with specific correspondents seems to produce more productive outcomes (considering the academic performance of group assignments or projects with correspondents). For example, in establishing the known correspondents archive, machine learning, natural language processing, and IBM Watson Tone Analyzer are leveraged to analyze conversations among correspondents and assess group dynamics among correspondents. The known correspondents archive may include productivity scores ranking pairs of correspondents. The productivity scores are obtained by analyzing data from known correspondents archive.

At step 104, the computing device or server detects initialization of a breakout session in the virtual classroom. In some embodiments, the breakout session may be initiated by an instructor. In some other embodiments, the initiation of breakout session may be detected by an audio system; for example, the audio system receives phrases of initiating the breakout session (such as "Alright, now we're going to break into groups.").

At step 105, the computing device or server receives, from an instructor, requirements of group settings. When the breakout session is initiated, the computing device or server may prompt the instructor and requires the instructor to input the requirements of group settings. From the instructor, the computing device or server may receive a requirement of a size of each group. The computing device or server may further receive a requirement about how the students are grouped, and then the computing device or server determines whether groups each including students with similar academic profiles or groups each including students with diverse academic profiles are requested. The computing device or server may further receive another requirement about how the students are grouped, and then the computing device or server determines whether groups each including students having well-established relationships or groups each including students having no well-established relationships are requested.

At step 106, the computing device or server determines optimal groups that yield most productive results, based on the profiles of the students (which are retrieved at step 102), the known correspondents archive (which is retrieved at step 103), and the requirements of the group settings (which are received at step 105), using a machine learning model. The machine learning model has been trained with data in previous breakout sessions in virtual classrooms.

At step 107, the computing device or server provides the instructor with the optimal groups in the breakout session. The instructor groups the students in the breakout session, according to the optimal groups suggested by the machine learning model. The instructor groups may manually modify any of the proposed groupings. Now, the breakout session begins.

At step 108, the computing device or server monitors activities of the students in the breakout session. For example, the computing device or server monitors academic performances of the students during the current breakout session, how the students communicate with each other during the current breakout session, how the students focus on assignments or projects during the current breakout session, and how the students distribute time in their participation of discussion and working on assignments or projects.

At step 109, the computing device or server updates the profiles of the students and the known correspondents archive. Updating the profiles of the students and the known correspondents archive is based on monitoring (at step 108) activities of the students during the current breakout session.

At step 110, the computing device or server trains the machine learning model with results of the breakout session. The machine learning model is trained by using data obtained from monitoring (at step 108) activities of the students during the current breakout session. Furthermore, the machine learning model is trained by using user feedback from the instructor and the students and system feedback. In the user feedback, evaluations on the groupings in the breakout session are obtained from the instructor and the students, and the evaluations reflect satisfactory levels of the instructor and the students. In the system feedback, the computing device or server determines whether productivities of the proposed optimal groups are as predicted by the machine learning model, determines whether interactions among the students match data in the known correspondents archive, determined whether academic performances of the students match data in the student profiles. In the system feedback, the computing device or server inputs user feedback into a learning algorithm to determine whether the groupings are successful in producing productive results. The computing device or server will input successful groupings as positive reinforcement into the machine learning model, which will generate similar groupings in the future. The computing device or server will input unsuccessful groupings as negative reinforcement into the machine learning model, and the negative enforcement will prompt the machine learning model to modify its data and future groupings to achieve higher success.

Figure 2:
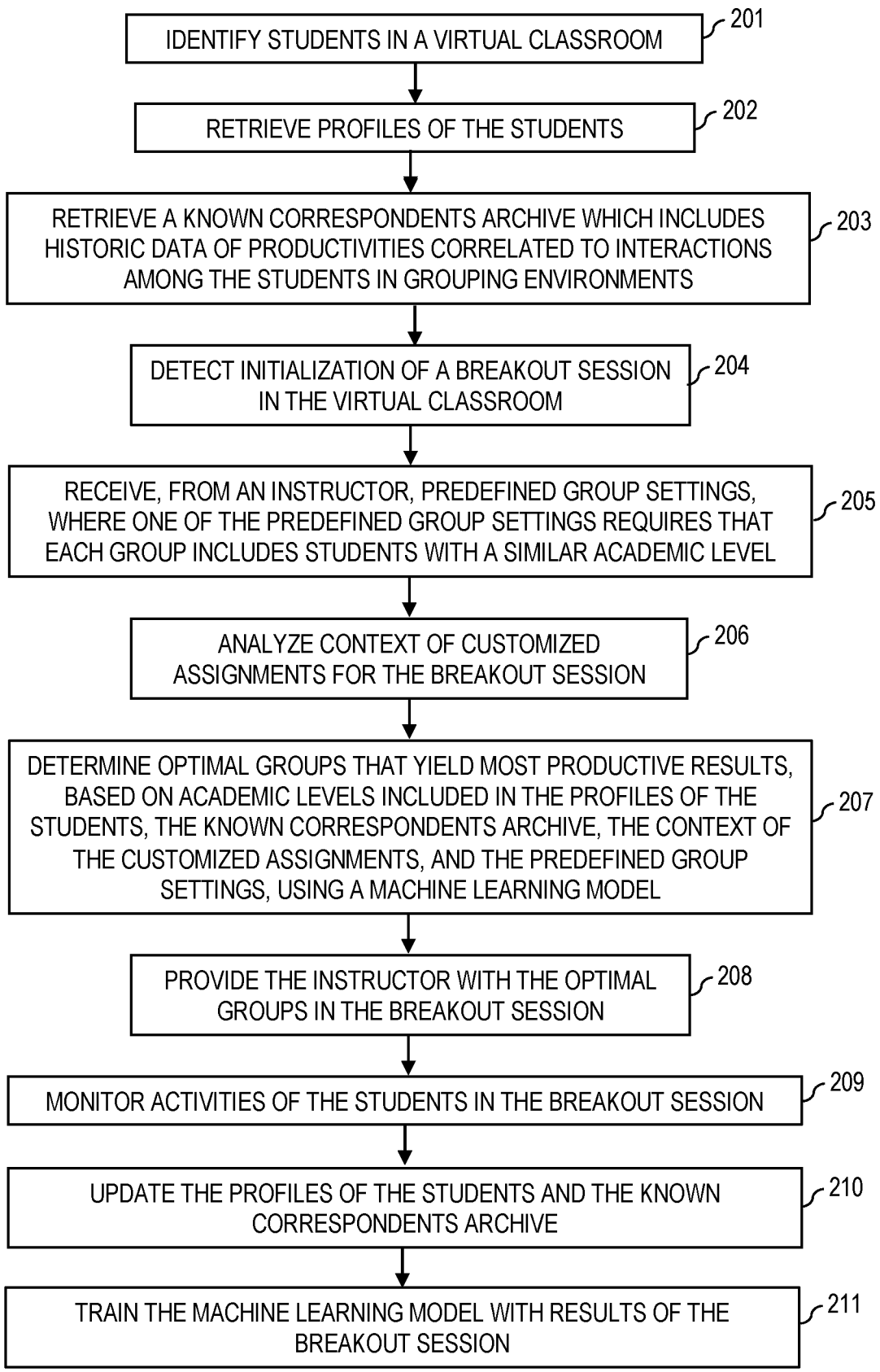
FIG. 2 presents a flowchart showing operational steps of optimizing groupings in a breakout session in a virtual classroom, in accordance with another embodiment of the present invention.

FIG. 2 presents a flowchart showing operational steps of optimizing groupings in a breakout session in a virtual classroom, in accordance with another embodiment of the present invention. The operational steps shown in FIG. 2 are implemented by a computing device or a server. A computing device or server is described in more detail in later paragraphs with reference to FIG. 3. In some embodiments, the operational steps may be implemented in a cloud computing environment. The cloud computing environment is described in later paragraphs with reference to FIG. 4 and FIG. 5. A system of optimizing groupings in a breakout session in a virtual classroom is installed as an extension to an existing conferencing platforms if an instructor and students of a virtual classroom opt in using the system for optimizing groupings. Consents of the students and the instructor are required in using the system for optimizing groupings. In acquiring, processing, storing, transferring, and using the data by the system, laws are observed and privacy of the students and the instructor is protected.

At step 201, the computing device or server identifies students in a virtual classroom. At step 202, the computing device or server retrieves profiles of the students. At step 203, the computing device or server retrieves a known correspondents archive which includes historic data of productivities correlated to interactions among the students in grouping environments (or in previous breakout sessions of virtual classrooms). At step 204, the computing device or server detects initialization of a breakout session in the virtual classroom. Steps 201, 202, 203, and 204 in the embodiment shown in FIG. 2 are basically the same as steps 101, 102, 103, and 104 in the embodiment shown in FIG. 1, respectively. Detailed descriptions related to steps 201, 202, 203, and 204 are also basically the same as detailed description related to steps 101, 102, 103, and 104, respectively. Detailed description related to steps 101, 102, 103, and 104 are given in previous paragraphs with respect to steps 101, 102, 103, and 104.

At step 205, the computing device or server receives, from an instructor, predefined group settings, where one of the predefined group settings requires that each group includes students with a similar academic level. The predefined group settings have been determined by the instructor prior to starting the virtual classroom. The instructor plans to group the student into groups each including students with a similar academic level, such that the instructor is able to assign customized assignments to different groups, based on rigor for example. By assigning customized assignments to different groups, the students in different groups may receive different levels of academic challenges. The computing device or server may further receive a predefined size of each group. The computing device or server may further receive predefined requirement about how the students are grouped, and then the computing device or server determines whether groups each including students having well-established relationships or groups each including students having no well-established relationships are requested.

At step 206, the computing device or server analyzes context of customized assignments for the breakout session. For example, the computing device or server analyzes whether the customized assignments are highly collaborative ones that require extensive teamwork and cooperation, the computing device or server analyzes whether the customized assignments require some individual work as well as collaboration, and the computing device or server analyzes what subject matters are studied in the customized assignments. These contextual analyses are performed by leveraging existing algorithms such as Bag of Words, Word2Vec, and BERT (Bidirectional Encoder Representations from Transformers).

At step 207, the computing device or server determines optimal groups that yield most productive results, based on academic levels included in the profiles of the students (which are retrieved at step 202), the known correspondents archive (which is retrieved at step 103), the context of the customized assignments (analyzed at step 206), and the predefined group settings (which are received at step 205), using a machine learning model. The machine learning model has been trained with data in previous breakout sessions in virtual classrooms.

At step 208, the computing device or server provides the instructor with the optimal groups in the breakout session. At step 209, the computing device or server monitors activities of the students in the breakout session. At step 210, the computing device or server updates the profiles of the students and the known correspondents archive. At step 211, the computing device or server trains the machine learning model with results of the breakout session. Steps 208, 209, 210, and 211 in the embodiment shown in FIG. 2 are basically the same as steps 107, 108, 109, and 110 in the embodiment shown in FIG. 1, respectively. Detailed descriptions related to steps 208, 209, 210, and 211 are also basically the same as detailed description related to steps 107, 108, 109, and 110, respectively. Detailed description related to steps 107, 108, 109, and 110 are given in previous paragraphs with respect to steps 107, 108, 109, and 110.

Figure 3:
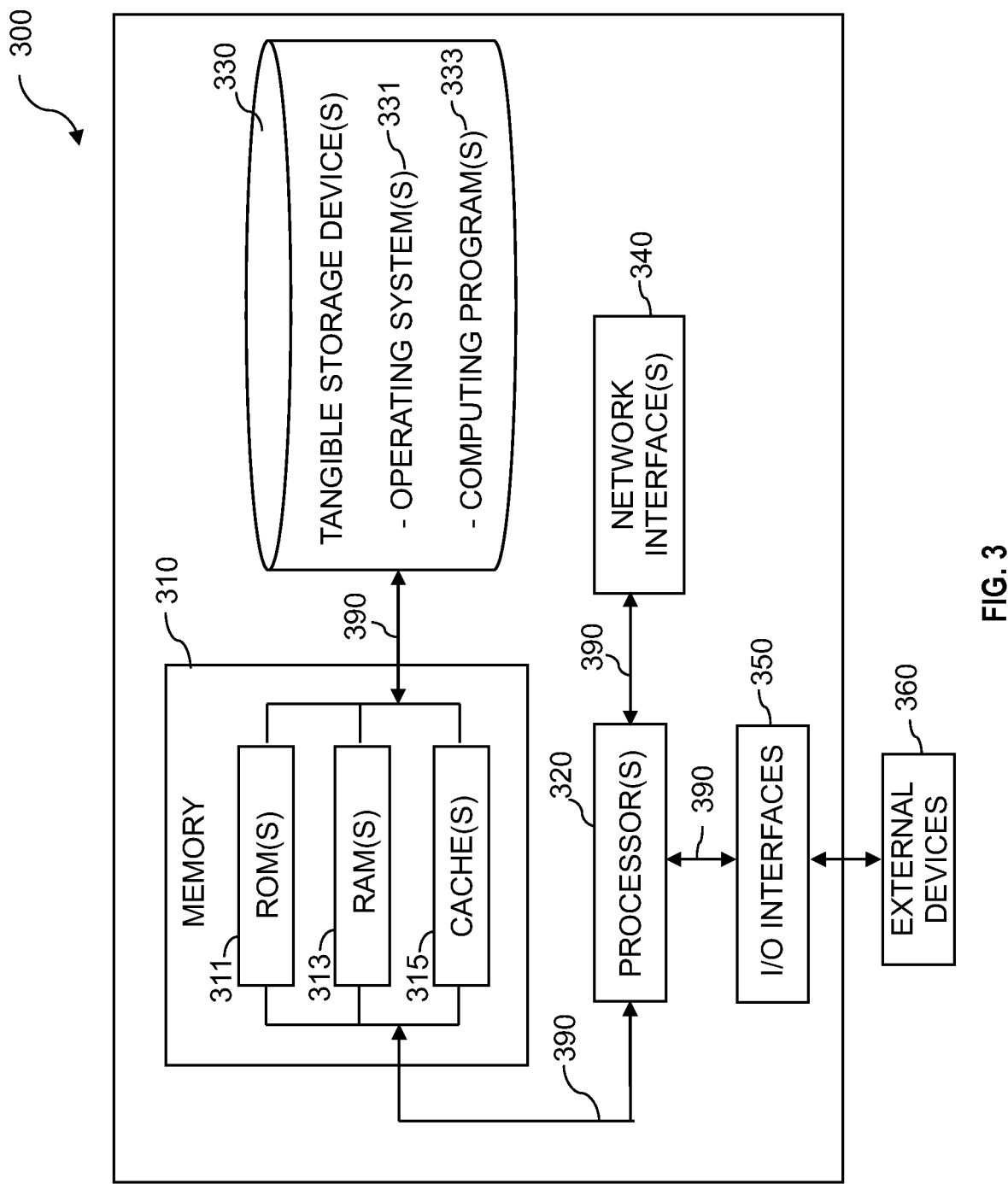
FIG. 3 is a diagram illustrating components of a computing device or server, in accordance with one embodiment of the present invention.
Figure 4:
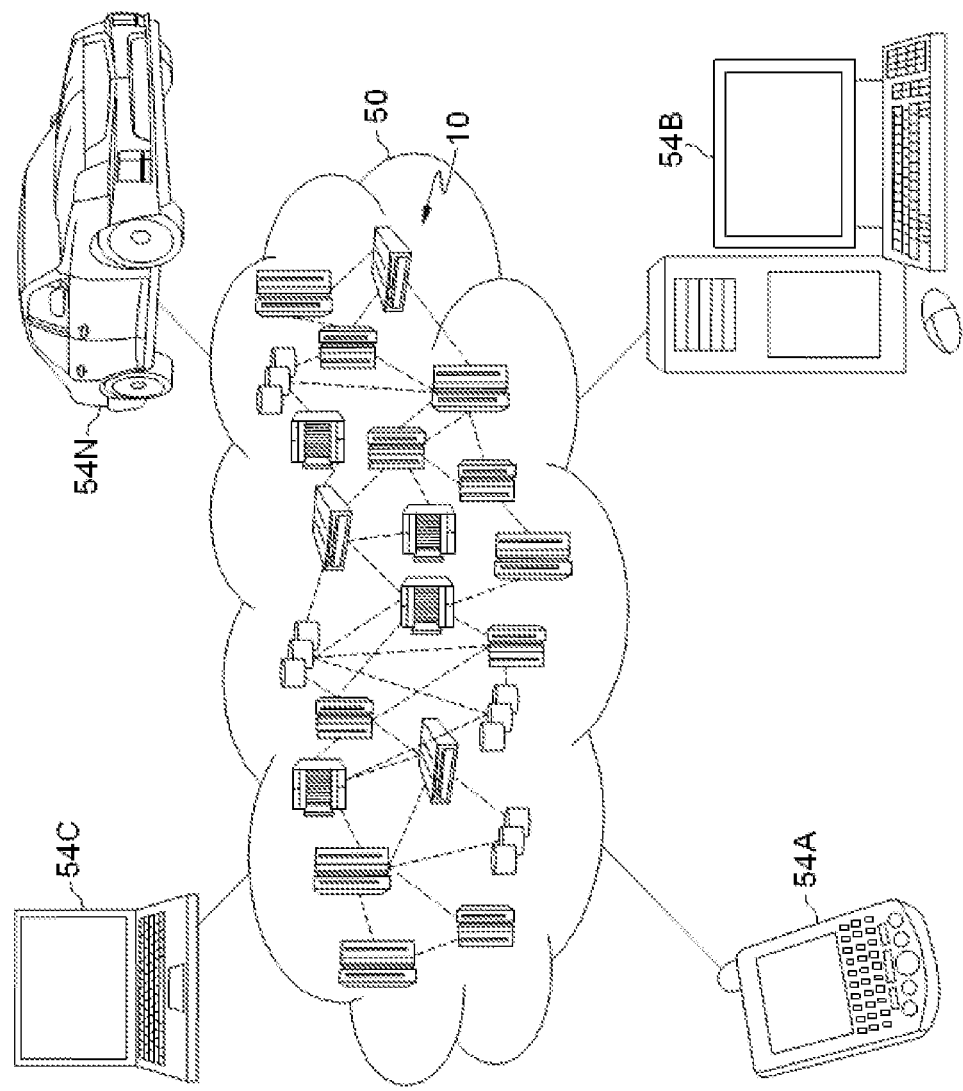
FIG. 4 depicts a cloud computing environment, in accordance with one embodiment of the present invention.

FIG. 3 is a diagram illustrating components of computing device or server 300, in accordance with one embodiment of the present invention. It should be appreciated that FIG. 3 provides only an illustration of one implementation and does not imply any limitations with regard to the environment in which different embodiments may be implemented.

Referring to FIG. 3, computing device or server 300 includes processor(s) 320, memory 310, and tangible storage device(s) 330. In FIG. 3, communications among the above-mentioned components of computing device or server 300 are denoted by numeral 390. Memory 310 includes ROM(s) (Read Only Memory) 311, RAM(s) (Random Access Memory) 313, and cache(s) 315. One or more operating systems 331 and one or more computer programs 333 reside on one or more computer readable tangible storage device(s) 330.

Computing device or server 300 further includes I/O interface(s) 350. I/O interface(s) 350 allows for input and output of data with external device(s) 360 that may be connected to computing device or server 300. Computing device or server 300 further includes network interface(s) 340 for communications between computing device or server 300 and a computer network.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
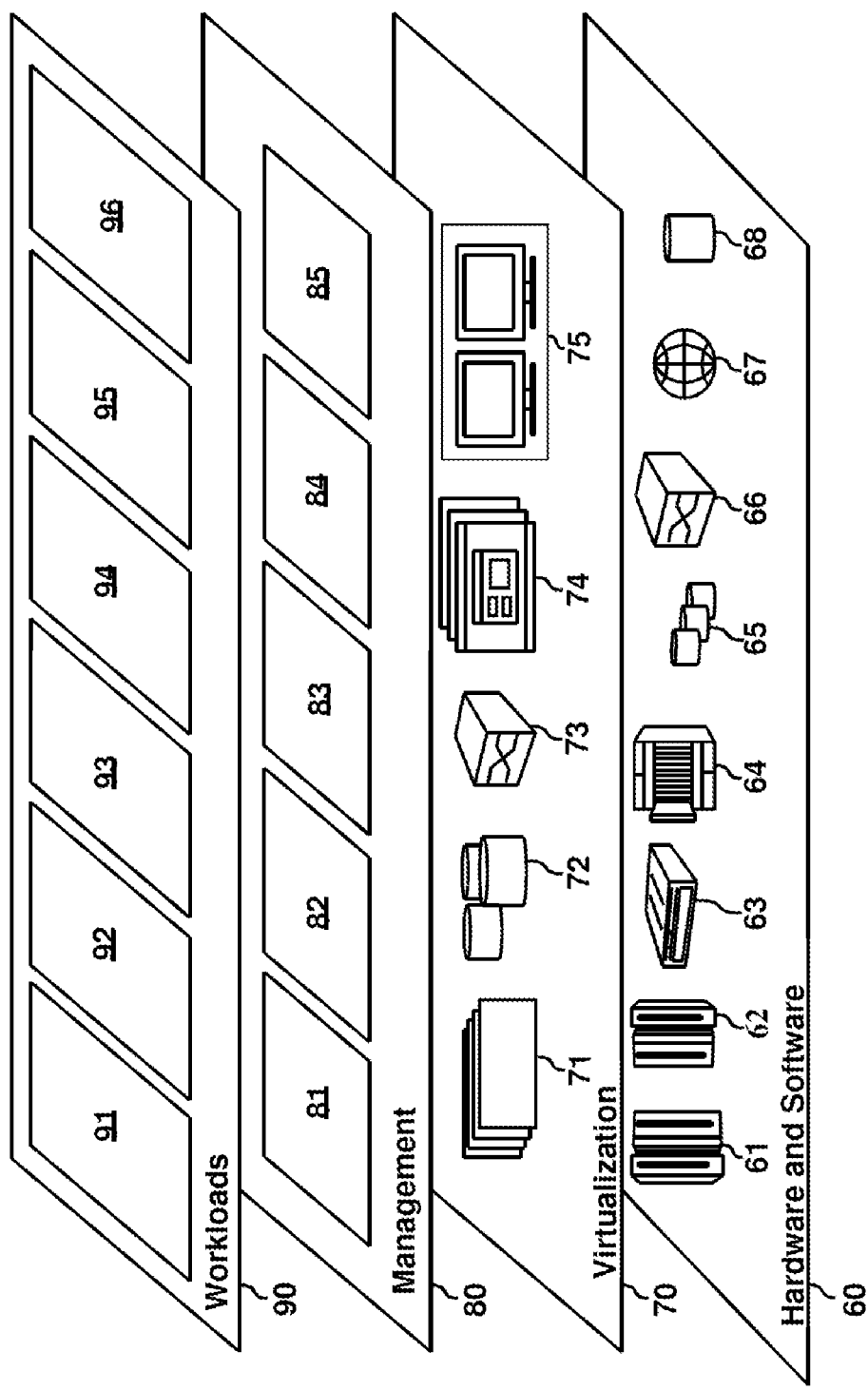
FIG. 5 depicts abstraction model layers in a cloud computing environment, in accordance with one embodiment of the present invention.

Referring now to FIG. 5, illustrative cloud computing environment 50 is depicted. As shown, cloud computing environment 50 includes one or more cloud computing nodes 10 with which local computing devices are used by cloud consumers, such as mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N are intended to be illustrative only and that computing nodes 10 and cloud computing environment 50 can communicate with any type of computerized device over any type of network and/or network addressable connection (e.g., using a web browser).

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and function 96. Function 96 in the present invention is the functionality of optimizing groupings in a breakout session in a virtual classroom.

What is claimed is:

1. A computer-implemented method for optimizing groupings in a breakout session in a virtual classroom, the method comprising:
    retrieving profiles of students in the virtual classroom, the profiles of the students including data of academic performances of the students;
    retrieving a known correspondents archive which includes historic data of productivities correlated to interactions among the students, the known correspondents archive including productivity scores ranking pairs of the students;
    detecting an initialization of the breakout session in the virtual classroom based upon an utterance of a specific phrase;
    in response to detecting the initialization of the breakout session in the virtual classroom, determining optimal groups that yield most productive results, based on the profiles of the students, the known correspondents archive, and requirements of group settings given by an instructor, using a machine learning model;
    providing the instructor with the optimal groups; and
    training the machine learning model to select future groupings using at least one successful grouping as positive reinforcement input data and at least one unsuccessful grouping as negative reinforcement input data, wherein the at least one successful grouping and the at least one unsuccessful grouping is determined in part using a speech tone analyzer.

2. The computer-implemented method of claim 1, further comprising:
    monitoring activities of the students in the breakout session; and
    updating the profiles of the students and the known correspondents archive,
    wherein the virtual classroom comprises a virtual conferencing platform.

3. The computer-implemented method of claim 2, further comprising:
    receiving, from the instructor and the students, feedback on evaluations of the groupings in the breakout session; and
    determining whether the groupings are successful by analyzing the results of the breakout session;
    in response to determining that the groupings are successful, inputting the at least one successful groupings as the positive reinforcement input data into the machine learning model; and
    in response to determining that the groupings are unsuccessful, inputting the at least one unsuccessful groupings as the negative reinforcement input data into the machine learning model and prompting the machine learning model to modify data and future groupings.

4. The computer-implemented method of claim 1, further comprising:
    prompting the instructor and requiring the instructor to input the requirements of the group settings.

5. The computer-implemented method of claim 4, further comprising: receiving, from the instructor, a requirement of a size of each group.

6. The computer-implemented method of claim 4, further comprising:
    receiving, from the instructor, a requirement about how the students are grouped; and
    determining whether groups each including students with similar academic profiles or groups each including students with diverse academic profiles are requested.

7. The computer-implemented method of claim 4, further comprising:
    receiving, from the instructor, a requirement about how the students are grouped; and
    determining whether groups each including students with well-established relationships or groups each including students with no well-established relationships are requested.

8. A computer program product for optimizing groupings in a breakout session in a virtual classroom, the computer program product comprising a computer readable storage medium having program instructions embodied therewith, the program instructions executable by one or more processors, the program instructions executable to:
    retrieve profiles of students in the virtual classroom, the profiles of the students including data of academic performances of the students;
    retrieve a known correspondents archive which includes historic data of productivities correlated to interactions among the students, the known correspondents archive including productivity scores ranking pairs of the students;
    in response to initialization of the breakout session in the virtual classroom, determine optimal groups that yield most productive results, based on the profiles of the students, the known correspondents archive, and requirements of group settings given by an instructor, using a machine learning model;
    provide the instructor with the optimal groups; and
    train the machine learning model to select future groupings using at least one successful grouping as positive reinforcement input data and at least one unsuccessful grouping as negative reinforcement input data, wherein the at least one successful grouping and the at least one unsuccessful grouping is determined in part using a speech tone analyzer.

9. The computer program product of claim 8, further comprising the program instructions executable to:
    monitor activities of the students in the breakout session; and
    update the profiles of the students and the known correspondents archive.

10. The computer program product of claim 9, further comprising the program instructions executable to:
    receive, from the instructor and the students, feedback on evaluations of the groupings in the breakout session; and
    determine whether the groupings are successful by analyzing the results of the breakout session;
    in response to determining that the groupings are successful, input the at least one successful groupings as the positive reinforcement input data into the machine learning model; and
    in response to determining that the groupings are unsuccessful, input the at least one unsuccessful groupings as the negative reinforcement input data into the machine learning model and prompt the machine learning model to modify data and future groupings.

11. The computer program product of claim 8, further comprising the program instructions executable to: prompt the instructor and require the instructor to input the requirements of the group settings.

12. The computer program product of claim 11, further comprising the program instructions executable to: receive, from the instructor, a requirement of a size of each group.

13. The computer program product of claim 11, further comprising the program instructions executable to:
receive, from the instructor, a requirement about how the students are grouped; and
determine whether groups each including students with similar academic profiles or groups each including students with diverse academic profiles are requested.

14. The computer program product of claim 11, further comprising program instructions executable to:
receive, from the instructor, requirement about how the students are grouped; and
determine whether groups each including students with well-established relationships or groups each including students with no well-established relationships are requested.

15. A computer-implemented method for optimizing groupings in a breakout session in a virtual classroom, the method comprising:
retrieving profiles of students in the virtual classroom, the profiles of the students including data of academic performances of the students;
retrieving a known correspondents archive which includes historic data of productivities correlated to interactions among the students, the known correspondents archive including productivity scores ranking pairs of the students;
receiving, from an instructor, predefined group settings, wherein one of the predefined group settings requires that each group includes students with a similar academic level;
analyzing context of customized assignments for the breakout session, wherein the customized assignments have different levels of academic challenges for different groups;
determining optimal groups that yield most productive results, based on academic levels included in the profiles of the students, the known correspondents archive, the context of the customized assignments, and the predefined group settings, using a machine learning model;
providing the instructor with the optimal groups for the breakout session in the virtual classroom;
assigning the customized assignments to respective ones of the optimal groups; and
training the machine learning model to select future groupings using at least one successful grouping as positive reinforcement input data and at least one unsuccessful grouping as negative reinforcement input data, wherein the at least one successful grouping and the at least one unsuccessful grouping is determined in part using a speech tone analyzer.

16. The computer-implemented method of claim 15, further comprising:
monitoring activities of the students in the breakout session; and
updating the profiles of the students and the known correspondents archive.

17. The computer-implemented method of claim 16, further comprising:
receiving user login credentials for the instructor and the students, wherein the login credentials comprise audio voice recognition;
receiving, from the instructor and the students, feedback on evaluations of the groupings in the breakout session; and
determining whether the groupings are successful by analyzing the results of the breakout session;
in response to determining that the groupings are successful, inputting the at least one successful groupings as the positive reinforcement input data into the machine learning model; and
in response to determining that the groupings are unsuccessful, inputting the at least one unsuccessful groupings as the negative reinforcement input data into the machine learning model and prompting the machine learning model to modify data and future groupings.

18. The computer-implemented method of claim 15, further comprising:
in receiving the predefined group settings, receiving, from the instructor, a predefined size of each group.

19. The computer-implemented method of claim 15, further comprising:
in receiving the predefined group settings, receiving, from the instructor, a requirement about how the students are grouped; and
determining whether groups each including students with well-established relationships or groups each including students with no well-established relationships are requested.

20. The computer-implemented method of claim 15, wherein the virtual classroom comprises a virtual conferencing platform.

* * * * *